(12) United States Patent
Takahashi

(10) Patent No.: US 9,164,197 B2
(45) Date of Patent: Oct. 20, 2015

(54) HYDROSILYLATION-CURABLE SILICONE RUBBER COMPOSITION

(71) Applicant: MOMENTIVE PERFORMANCE MATERIALS JAPAN LLC, Minato-ku, Tokyo (JP)

(72) Inventor: Hideo Takahashi, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 0 days.

(21) Appl. No.: 14/346,525

(22) PCT Filed: Nov. 19, 2012

(86) PCT No.: PCT/JP2012/079885
§ 371 (c)(1),
(2) Date: Mar. 21, 2014

(87) PCT Pub. No.: WO2013/084699
PCT Pub. Date: Jun. 13, 2013

(65) Prior Publication Data
US 2014/0275384 A1    Sep. 18, 2014

(30) Foreign Application Priority Data
Dec. 8, 2011 (JP) ................... 2011-268788

(51) Int. Cl.
*G02B 1/04* (2006.01)
*C08L 83/04* (2006.01)
*C08K 5/098* (2006.01)

(52) U.S. Cl.
CPC .. *G02B 1/04* (2013.01); *C08K 5/098* (2013.01)

(58) Field of Classification Search
None
See application file for complete search history.

(56) References Cited

U.S. PATENT DOCUMENTS

| | | | |
|---|---|---|---|
| 2,999,076 A * | 9/1961 | Talcott | 524/588 |
| 3,142,655 A | 7/1964 | Bobear | |
| 3,884,950 A * | 5/1975 | Koda et al. | 556/401 |
| 2010/0280163 A1 | 11/2010 | Hasegawa et al. | |

FOREIGN PATENT DOCUMENTS

| | | | |
|---|---|---|---|
| EP | 1 526 155 A1 | | 4/2005 |
| JP | 43-3019 B1 | | 2/1968 |
| JP | 55-58253 | * | 4/1980 |
| JP | 55-58253 A | | 4/1980 |
| JP | 60-163966 A | | 8/1985 |
| JP | 61-285257 | * | 12/1986 |
| JP | 6-293862 A | | 10/1994 |
| JP | 2000-198930 | * | 7/2000 |
| JP | 2000-198930 A | | 7/2000 |
| JP | 2005-42099 A | | 2/2005 |
| JP | 2006-213789 A | | 8/2006 |
| JP | 2008-101056 A | | 5/2008 |
| JP | 2008-291124 A | | 12/2008 |
| JP | 2008-291148 | * | 12/2008 |
| WO | WO 2006/077667 A1 | | 7/2006 |
| WO | WO 2008/082001 A1 | | 7/2008 |

OTHER PUBLICATIONS

Machine-generated translation of JP 2000-198930 into English.*
English translation of Form PCT/ISA/210 issued in PCT/JP2012/079885 with a mailing date of Feb. 26, 2013 (2 pages).
English translation of International Preliminary Report on Patentability and Written Opinion of the International Searching Authority for PCT/JP2012/079885 (6 pages).
Supplementary European Search Report dated Mar. 13, 2015 for corresponding Application No. EP 12 85 6572 (5 pgs.).

* cited by examiner

*Primary Examiner* — Marc Zimmer
(74) *Attorney, Agent, or Firm* — Flynn, Thiel, Boutell & Tanis, P.C.

(57) ABSTRACT

A silicone rubber composition having a good transparency and hardness is made of a hydrosilylation-curable silicone rubber composition containing (A) 100 parts by mass of an organopolysiloxane, (B) a silicone resin, (C) an organohydrogenpolysiloxane, (D) a rare earth salt of a carboxylic acid represented by general formula (I): $(RCOO)_n M$ (I) (in the formula, R denotes a monovalent hydrocarbon group having 4 to 10 carbon atoms, n denotes a number between 3 and 4, and M denotes a rare earth element selected from among cerium (Ce), lanthanum (La), neodymium (Nd), praseodymium (Pr), samarium (Sm) and the like), and (E) a hydrosilylation reaction catalyst.

8 Claims, No Drawings

HYDROSILYLATION-CURABLE SILICONE RUBBER COMPOSITION

TECHNICAL FIELD

The present invention relates to a hydrosilylation-curable silicone rubber composition capable of obtaining a highly transparent cured product and a molded article obtained therefrom.

BACKGROUND ART

As molded articles for optical use, there is proposed a silicone rubber composition for optical use because a cured product having high transparency and high hardness can be obtained (JP-A 2008-101056, JP-A 2008-291124).

In applying a silicone rubber composition to optical use, there is a case where heat resistance is required in addition to transparency and hardness.

As a method of imparting heat resistance to a silicone rubber, there is known a method of blending a metal oxide powder.

In JP-B 43-3019, an organopolysiloxane rubber composition in which heat resistance is improved by blending an octanoate, chloride or acetate of cerium, lanthanum, neodymium, and the like into a silicone rubber.

In JP-A 60-163966, there is described a heat-resistant organopolysiloxane composition in which there was blended, into an organopolysiloxane as the component A, a reaction product obtained by subjecting an organopolysiloxane, a cerium carboxylate, a titanium or zirconium compound to heat treatment at a temperature of 150° C. or more as the component B. However, in any of Examples 1 to 3, there was produced a silicone oil or a dimethylpolysiloxane fluid.

In JP-B 43-3019, JP-A 60-163966, there is no description of transparency.

In WO-A1 2008/082001, there is described a thermally curable silicone rubber composition containing a cerium oxide powder in an amount of 0.001 to 10% by mass, and it is described that a total light transmittance at a thickness of 1 mm is 90% or more.

DISCLOSURE OF THE INVENTION

In the prior art, there were not any silicone rubber compositions capable of obtaining a cured product excellent in transparency, hardness and heat resistance, and the like.

The object of the present invention is to provide a silicone rubber composition capable of obtaining a cured product excellent in transparency, hardness and heat resistance, and the like, and a molded article obtained therefrom.

The present invention provides the following invention as a means for solving the problem.

A hydrosilylation-curable silicone rubber composition including:

(A) 100 parts by mass of an organopolysiloxane having an average degree of polymerization of 50 to 10000 and containing at least two alkenyl groups bonded to a silicon atom in one molecule;

(B) 10 to 400 parts by mass of a silicone resin which includes units selected from $R_1SiO1/2$ unit (unit M), $SiO4/2$ unit (unit Q), $R_2SiO2/2$ unit (unit D), and $R_3SiO3/2$ unit (unit T) and in which a sum of the unit M, unit Q and unit T in the whole structural units is 80% by mole or more, wherein $R_1$, $R_2$ and $R_3$ are a monovalent hydrocarbon group having 1 to 6 carbon atoms, and at least two in one molecule are alkenyl groups;

(C) an organohydrogenpolysiloxane containing at least two hydrogen atoms bonded to a silicon atom in one molecule, in an amount in which the number of the hydrogen atoms bonded to a silicon atom per one alkenyl group bonded to a silicon atom in the component (A) and the component (B) is 1.0 to 10.0;

(D) a rare-earth salt of a carboxylic acid represented by the formula (I) or a mixture thereof:

$$(RCOO)_nM \qquad (I)$$

wherein R is a monovalent hydrocarbon group having 4 to 10 carbon atoms, n is a number of 3 to 4, and M is a rare-earth element selected from cerium (Ce), lanthanum (La), neodymium (Nd), praseodymium (Pr), and samarium (Sm); and (E) a hydrosilylation reaction catalyst.

Additionally, the present invention provides a molded article, as a means for solving another problem, including a cured product of the aforementioned hydrosilylation-curable silicone rubber composition, and the molded article has a total light transmittance at 600 nm of 90% or more in a case of a sheet having a thickness of 2 mm.

The molded article is used for coating or sealing optical lenses, optical waveguide plates, display layer or laminated plates, sensors, optical devices.

The molded article obtained by the composition of the present invention has high transparency, and is excellent in hardness, heat resistance and the like, and is suitable as optical uses, particularly an optical waveguide plate and an optical lens.

DETAILED DESCRIPTION OF THE INVENTION

Hydrosilylation-Curable Silicone Rubber Composition

Component (A)

The component (A) is an organopolysiloxane having an average degree of polymerization of 50 to 10000 and containing at least two alkenyl groups bonded to a silicon atom in one molecule.

A group bonded to silicon atom other than alkenyl group can include a monovalent hydrocarbon group.

Examples of the monovalent hydrocarbon group can include an alkyl group such as methyl, ethyl, propyl or butyl, an aryl group such as phenyl or trityl, a cycloalkyl group such as cyclohexyl, an aralkyl group such as benzyl or β-phenylethyl, or chrolomethyl, cyanoethyl in which a part or the whole of hydrogen atoms bonded to carbon atom of those groups are substituted by a halogen atom (except fluorine atom), and the like, and preferable is methyl group.

The alkenyl group bonded to silicon atom can include vinyl group, allyl group, and the like, and preferable is vinyl group.

The organopolysiloxane of the component (A) is preferably a linear one, but may be one containing a branched structure as a part thereof.

An average degree of polymerization of the organopolysiloxane of the component (A) is 50 to 10000, preferably 200 to 8000, and more preferably 500 to 1500.

Component (B)

The component (B) is a silicone resin including units selected from $R_1SiO1/2$ unit (unit M), $SiO4/2$ unit (unit Q), $R_2SiO2/2$ unit (unit D), and $R_3SiO3/2$ unit (unit T).

Each of the $R_1$, $R_2$, $R_3$ in the unit M, the unit D and the unit T is a monovalent hydrocarbon group having 1 to 6 carbon atoms, and at least two in one molecule are alkenyl groups. As the monovalent hydrocarbon group having 1 to 6 carbon atoms and the alkenyl group can be selected from the monovalent hydrocarbon group and the alkenyl group, bonded to silicon atom in the aforementioned organopolysiloxane of the component (A), and methyl group is preferable.

As to the component (B), preferably, a sum of the unit M, unit Q and unit T in the unit M, unit D, unit Q and unit T (whole structural units) is 80% by mole or more, and a sum of the unit M and unit Q in the whole structural units is 80% by mole or more.

Examples of the silicone resin of the component (B) can include a copolymer of vinyldimethylsiloxy group and the unit Q, a copolymer of vinyldimethylsiloxy group•trimethylsiloxy group and the unit Q, a copolymer of vinyldimethylsiloxy group•dimethylsiloxane unit and the unit Q, a copolymer of vinyldimethylsiloxy group•phenylsilsesquioxane unit and the unit Q, a copolymer of vinyldimethylsiloxy group•dimethylsiloxane unit and the unit Q, a copolymer of a vinyldimethylsiloxy group•dimethylsiloxane unit•phenylsilsequioxane unit and the unit Q, a copolymer of a trimethylsiloxy group•vinylmethylsiloxane unit and the unit Q, and the like.

A content of the component (B) in the composition is 10 to 400 parts by mass relative to 100 parts by mass of the component (A), preferably 20 to 300 parts by mass, and more preferably 30 to 200 parts by mass.

Component (C)

The component (C) is an organohydrogenpolysiloxane containing at least two hydrogen atoms bonded to a silicon atom in one molecule. The component (C) may be any of a linear, branched or circular one.

Examples of the component (C) include a diorganopolysiloxane terminated by dimethylhydrogensilyl group, a copolymer of a dimethylsiloxane unit and a methylhydrogensiloxane unit and an end trimethylsiloxane unit, a low-viscosity fluid of a dimethylhydrogensiloxane unit and $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, 1,5-dihydrogen-3,7-dihexyl-1,3,5,7-tetramethylcyclotetrasiloxane, and the like.

The amount of the component (C) in the composition is such that the number of the hydrogen atoms bonded to a silicon atom per one alkenyl group bonded to a silicon atom in the component (A) and the component (B) is 0.5 to 10.0, preferably 1.0 to 5.0.

Component (D)

The component (D) is a rare-earth salt of a carboxylic acid represented by the formula (I) or a mixture thereof:

(RCOO)$_n$M    (I)

wherein R is a monovalent hydrocarbon group having 4 to 10 carbon atoms, n is a number of 3 to 4, and M is a rare-earth element selected from cerium (Ce), lanthanum (La), neodymium (Nd), praseodymium (Pr), samarium (Sm).

The component (D) is preferably a cerium salt of the formula (I), or a mixture including a cerium salt and other rare-earth metal salt of the formula (I). Namely, the component (D) is preferably a cerium carboxylate or a mixture of the rare-earth salts of a carboxylic acid including a cerium carboxylate.

The amount of the component (D) in the composition is such that an amount of the rare-earth element is 5 to 300 ppm relative to 100 parts by mass of the component (A), preferably 8 to 250 ppm, and more preferably 10 to 200 ppm.

Component (E)

As the hydrosilylation reaction catalyst as to the component (E), there can be applied a known one, and there can be used a platinum element, a platinum compound, and a platinum complex, and specific examples thereof can include a chloroplatinic acid such as tetrachloroplatinic acid or hexachloroplatinic acid; a platinum-based complex such as a complex of platinic acid with an alcohol compound, aldehyde compound, ether compound or various olefins, or a platinum-vinylsiloxane complex; a palladium-based catalyst; a rhodium-based catalyst; and the like.

Meanwhile, a blending amount of the hydrosilylation reaction catalyst can be a catalytic amount, and usually, 0.5 to 1,000 ppm relative to 100 parts by mass of the component (A), preferably 1 to 200 ppm, and more preferably 1 to 100 ppm.

As the other components, there can be used a metal oxide as a heat resistance improver, a flame retardant aid, an electroconductivity-imparting agent, an antistatic agent, a processing aid, and the like.

In addition, there can also be blended an alkoxysilane-based compound containing an alkoxysilyl group; a silane coupling agent; a condensation catalyst such as a titanium-based or zirconium-based catalyst; and the like, as a crosslinking aid.

The composition of the present invention can be obtained by mixing uniformly the aforementioned respective components. In this mixing, a mixing machine usually used for a general blending of silicone rubber can be used, and for example, there can be used a universal kneader, a planetary mixer, Banbury mixer, kneader, a gate mixer, Shinagawa mixer, a pressurizing mixer, a three-roll, and a twin-roll.

Molded Article

The molded article of the present invention is one formed of a cured product of the aforementioned composition of the present invention, and has a total light transmittance of 90% or more at 600 nm when the molded article formed of the cured product is a sheet having a thickness of 2 mm.

Since the molded article of the present invention has a high transparency and is excellent in hardness and heat resistance, the article can be used for various optical uses, lighting equipment uses, and can be utilized for coating or sealing display layers or laminated plates, sensors, and optical devices, in addition to for coating or sealing, for example, optical waveguide plates and optical lenses.

EXAMPLE

Examples and Comparative Examples

An organopolysiloxane of the component (A) and a silicone resin of the component (B) were mixed using a universal kneader. At this time, in order to disperse well the component (B) in the component (A), the component (B) was blended using 60% xylene solution so that the blending amount of the component (B) was shown in Table 1.

After mixing, xylene contained in the mixture was distilled off under 140° C./667 Pa {5 mmHg}.

Then, after cooling to normal temperature, the hydrosilylation catalyst of the component (E), 1-ethynyl-1-cyclohexanol of the reaction inhibitor, and the organohydrogensiloxane of the component (C) were blended.

Finally, the component (D) or cerium oxide or cerium hydroxide serving as a comparison component of the component (D) was mixed and the silicone rubber composition shown in Table 1 was prepared. With respect to the obtained compositions, each of the measurements shown in Table 1 was carried out.

Details of the components shown in Table 1 and Table 2 are as follows.

Component (A)

Dimethylpolysiloxane terminated at the both ends with dimethylvinylsiloxy groups (average degree of polymerization 940)

Component (B)
Polymethylvinylsiloxane resin including the unit M, the unit $M^v$ and the unit Q and being represented by $M_5M^vQ8$ as a mole unit ratio.
However, the units are as follows:
Unit M: $(CH_3)_3SiO1/2-$
Unit $M^v$: $(CH_3)_2(CH_2=CH)SiO1/2-$
Unit Q: $SiO4/2$ (4 functionality)
Component (C)
Polymethylhydrogensiloxane including the unit $M^H$ and the unit Q and being represented by $M^H{}_8Q_4$ (average-molecular weight 800)
However, unit $M^H$: $(CH_3)_2HSiO1/2-$, unit Q: $SiO4/2$ (4 functionality)
Component (D)
(D-1): Rare earth-OCTOATE 6% (supplier: DIC) (rare-earth 2-ethyl hexanoate), rare-earth element 6%: Ce 3.1%, Nd 0.95%, Pr 0.31%, Sm 0.01%, La 1.59%)
(D-2): Cerium (III) 2-ethylhexanoate, 49% in 2-ethylhexanoic acid, Ce 12% (supplier: Wako Pure Chemical Industries, Ltd.)
Comparison Component of the Component (D)
Cerium oxide (supplier: DAIICHI KIGENSO KAGAKU KOGYO CO., LTD.)
Cerium hydroxide (supplier: DAIICHI KIGENSO KAGAKU KOGYO CO., LTD.)
Component (E)
Platinum-vinylsiloxane complex with a platinum content of 2% by mass (Others)
Reaction inhibitor: 1-Ethynyl-1-cyclohexanol
The measuring methods shown in Table 1 and Table 2 are as follows:
The initial value and the value after heat treatment (held for 7 days at 200° C.) were indicated.

The rate of change of tensile strength and the rate of change of elongation were calculated by (Initial value−value after heat treatment)/Initial value× 100.

(Method of Producing Sheets)
Each of the components shown in Table 1 and Table 2 was uniformly mixed and stirred, and was then deformed under reduced pressure. Each of the obtained compositions was casted into a die, subjected to press-molding for 10 minutes at 150° C., followed by post-curing for 4 hours at 150° C., and thus there was obtained a molded article of the silicone rubber composition having a thickness of about 2 mm.
(Elongation, Hardness, Tensile Strength)
In accordance with JIS K6249.
(Total Light Transmittance)
The total light transmittance at 600 nm was measured using a spectrophotometer CM-3500d manufactured by KONICA MINOLTA (thickness of test piece to be measured 2 mm).
(Yellow Index)
Measurement was carried out in accordance with ASTM D1925 by a spectrophotometer CM-3500d manufactured by KONICA MINOLTA. The smaller the value is, the smaller the coloration is.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Composition | (A) (Parts by mass) | 100 | 100 | 100 | 100 | 100 | 100 | 100 | 100 | 100 |
| | (B) (Parts by mass) | 45 | 45 | 45 | 45 | 45 | 45 | 45 | 45 | 45 |
| | (C) (Parts by mass) | 10 | 10 | 10 | 10 | 10 | 10 | 10 | 10 | 10 |
| | (D-1) (Parts by mass) | 0.035 | 0.075 | 0.150 | 0.295 | 0.890 | | | | |
| | (D-2) (Parts by mass) | | | | | | 0.0097 | 0.0195 | 0.078 | 0.233 |
| | Cerium oxide (Parts by mass) | | | | | | | | | |
| | Cerium hydroxide (Parts by mass) | | | | | | | | | |
| | (E) (ppm) | 7 | 7 | 7 | 7 | 7 | 7 | 7 | 7 | 7 |
| | Reaction inhibitor (Parts by mass) | 0.4 | 0.4 | 0.4 | 0.4 | 0.4 | 0.4 | 0.4 | 0.4 | 0.4 |
| | Rare-earth element content in composition (ppm) | 13 | 28 | 55 | 109 | 327 | 7 | 14 | 58 | 172 |
| Initial value | Hardness (TypeA) | 63 | 64 | 62 | 62 | 62 | 62 | 62 | 61 | 61 |
| | Tensile strength (MPa) | 6.8 | 6.7 | 7.4 | 7.4 | 6.6 | 7.4 | 7.2 | 6.2 | 6.3 |
| | Elongation (%) | 100 | 100 | 120 | 100 | 100 | 110 | 110 | 90 | 90 |
| | Total light transmittance (%) | 92.9 | 92.9 | 92.7 | 92.3 | 92 | 92.2 | 91.2 | 92.9 | 92.5 |
| | Yellow Index (ASTM D1925) | 1.4 | 1.4 | 1.6 | 1.4 | 1.7 | 1.5 | 1.8 | 1.9 | 1.9 |
| Value after heat treatment | Hardness (TypeA)1 | 64 | 64 | 61 | 62 | 61 | 63 | 62 | 62 | 62 |
| | Tensile strength (MPa) | 6.2 | 6.3 | 7.0 | 6.2 | 6.0 | 6.7 | 6.8 | 6.3 | 6.0 |
| | Elongation (%) | 90 | 90 | 120 | 100 | 90 | 100 | 100 | 90 | 90 |
| | Total light transmittance (%) | 92.4 | 92.4 | 92.2 | 92 | 91.8 | 92.8 | 92.9 | 92.9 | 92.3 |
| | Yellow Index (ASTM D1925) | 1.4 | 1.4 | 1.6 | 1.9 | 2.7 | 1.8 | 1.8 | 1.8 | 2.8 |
| | Change of hardness | 1 | 0 | −1 | 0 | −1 | 1 | 0 | 1 | 1 |
| | Rate of change of tensile strength (%) | −9 | −6 | −5 | −16 | −9 | −9 | −6 | 2 | −5 |
| | Rate of change of elongation (%) | −10 | −10 | 0 | 0 | −10 | −9 | −9 | 0 | 0 |

TABLE 2

| | | Comparative Example | | | | |
|---|---|---|---|---|---|---|
| | | 1 | 2 | 3 | 4 | 5 |
| Composition | (A) (Parts by mass) | 100 | 100 | 100 | 100 | 100 |
| | (B) (Parts by mass) | 45 | 45 | 45 | 45 | 45 |
| | (C) (Parts by mass) | 10 | 10 | 10 | 10 | 10 |
| | (D-1) (Parts by mass) | | | 2.08 | | |
| | (D-2) (Parts by mass) | | | | 0.58 | |

TABLE 2-continued

|  |  | Comparative Example ||||| 
|  |  | 1 | 2 | 3 | 4 | 5 |
|---|---|---|---|---|---|---|
|  | Cerium oxide (Parts by mass) |  |  |  | 1 |  |
|  | Cerium hydroxide (Parts by mass) |  |  |  |  | 1 |
|  | (E) (ppm) | 7 | 7 | 7 | 7 | 7 |
|  | Reaction inhibitor (Parts by mass) | 0.4 | 0.4 | 0.4 | 0.4 | 0.4 |
|  | Rare-earth element content in composition (ppm) | 0 | 759 | 427 | 0 | 0 |
| Initial value | Hardness (TypeA) | 65 | 61 | 61 | 62 | 62 |
|  | Tensile strength (MPa). | 5.6 | 6 | 6.2 | 7.4 | 7.6 |
|  | Elongation (%) | 100 | 90 | 80 | 110 | 120 |
|  | Total light transmittance (%) | 93.0 | 91.4 | 91.7 | 57.6 | 58.7 |
|  | Yellow Index(ASTM D1925) | 1.3 | 2.2 | 2.4 | 22.5 | 23 |
| Value after heat treatment | Hardness (TypeA)1 | 78 | 60 | 60 | 66 | 66 |
|  | Tensile strength (MPa) | 1.3 | 5.1 | 4.9 | 5.9 | 5.8 |
|  | Elongation (%) | 40 | 80 | 70 | 100 | 110 |
|  | Total light transmittance (%) | 90.7 | 90.2 | 90.5 | 56.8 | 57.6 |
|  | Yellow Index(ASTM D1925) | 1.7 | 5.5 | 5.3 | 23.2 | 23.7 |
|  | Change of hardness | 13 | −1 | −1 | 4 | 4 |
|  | Rate of change of tensile strength (%) | −77 | −15 | −21 | −20 | −24 |
|  | Rate of change of elongation (%) | −60 | −11 | −13 | −9 | −8 |

In Examples 1 to 9, there were obtained an excellent transparency, hardness, heat resistance etc. Comparative Example 4 corresponds to WO-A1 2008/082001, and the transparency (total light transmittance) was largely inferior.

The invention claimed is:

1. A hydrosilylation-curable silicone rubber composition comprising:
   (A) 100 parts by mass of an organopolysiloxane having an average degree of polymerization of 50 to 10000 and containing at least two alkenyl groups bonded to a silicon atom in one molecule;
   (B) 10 to 400 parts by mass of a silicone resin which includes units selected from a $R_1SiO1/2$ unit, which is unit M, $SiO4/2$ unit, which is unit Q, $R_2SiO2/2$ unit, which is unit D, and $R_3SiO3/2$ unit, which is unit T, and in which a sum of the unit M, unit Q and unit T in the whole structural units is 80% by mole or more, wherein $R_1$, $R_2$ and $R_3$ are a monovalent hydrocarbon group having 1 to 6 carbon atoms, and at least two in one molecule are alkenyl groups;
   (C) an organohydrogenpolysiloxane containing at least two hydrogen atoms bonded to a silicon atom in one molecule, in an amount in which the number of the hydrogen atoms bonded to a silicon atom per one alkenyl group bonded to a silicon atom in component (A) and component (B) is 1.0 to 10.0;
   (D) 5 to 300 ppm relative to 100 parts by mass of component (A) of a rare-earth salt of a carboxylic acid represented by the formula (I) or a mixture thereof:

$$(RCOO)_nM \quad (I)$$

wherein R is a monovalent hydrocarbon group having 4 to 10 carbon atoms, n is a number of 3 to 4, and M is a rare-earth element selected from cerium, lanthanum, neodymium, praseodymium, and samarium; and
   (E) a hydrosilylation reaction catalyst.

2. The hydrosilylation-curable silicone rubber composition according to claim 1, wherein component (B) is a silicone resin and a sum of the unit M and unit Q in the whole structural units is 80% by mole or more.

3. The hydrosilylation-curable silicone rubber composition according to claim 1, wherein the hydrosilylation reaction catalyst of component (E) is a platinum-based catalyst, a palladium-based catalyst, or a rhodium-based catalyst, and the content thereof as the platinum group metal is 1 to 100 ppm relative to 100 parts by mass of component (A).

4. The hydrosilylation-curable silicone rubber composition according to claim 1, wherein the rare-earth element is cerium.

5. The hydrosilylation-curable silicone rubber composition according to claim 1, wherein the rare-earth salt of component (D) is a cerium carboxylate or a mixture of the rare-earth salts of carboxylic acid including a cerium carboxylate.

6. A molded article comprising a cured product, composed of the hydrosilylation-curable silicone rubber composition according to claim 1.

7. The molded article according to claim 6, wherein the molded article comprising the cured product has a total light transmittance of 90% or more at 600 nm as a sheet having a thickness of 2 mm.

8. The molded article according to claim 6, which is for coating or sealing optical lenses, optical waveguide plates, display layers or laminated plates, sensors, and optical devices.

* * * * *